(12) United States Patent
Ganti et al.

(10) Patent No.: US 7,627,567 B2
(45) Date of Patent: Dec. 1, 2009

(54) SEGMENTATION OF STRINGS INTO STRUCTURED RECORDS

(75) Inventors: Venkatesh Ganti, Bellevue, WA (US); Vassilakis Theodore, Bellevue, WA (US); Yevgeny Agichtein, New York, NY (US)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 10/825,488

(22) Filed: Apr. 14, 2004

(65) Prior Publication Data

US 2005/0234906 A1 Oct. 20, 2005

(51) Int. Cl.
*G06F 17/30* (2006.01)
(52) U.S. Cl. .............................................. 707/5; 707/3
(58) Field of Classification Search ...................... 707/1, 707/5, 3
See application file for complete search history.

(56) References Cited

U.S. PATENT DOCUMENTS 5,095,432 A * 3/1992 Reed .............................. 704/9
2006/0235811 A1* 10/2006 Fairweather .................. 706/12

OTHER PUBLICATIONS

Borkar et al., Automatic segmentation of text into structured records, 2001 http://www.it.iitb.ac.in/~sunita/papers/sigmod01.pdf.*
Rie Kubota Ando, "Mostly-Unsupervised Statistical Segmentation of Japanese Sequences", Feb. 11, 2002, pp. 1-2 http://www.cs.cornell.edu/home/llee/papers/segmentjnle.pdf.*

E. Marsh and D. Perzanowski. MUC-7 Evaluation of IE Technology: Overview of Results, Proceedings of the 7th Message Understanding Conference (MUC-7). Morgan Kaufman, Apr. 29, 1998.
B. Adelberg. NoDoSE—A Tool for Semi-Automatically Extracting Structured and Semistructured Data from Text Documents. Sigmod, 1998 Seattle, WA, USA.
A. Arasu and H. Garcia-Molina. Extracting Structured Data from Web Pages. SIGMOD 2003, Jun. 9-12, 2003, San Diego, CA.
R. Baumgartner, S. Flesca, and G. Gottlob. Visual Web Information Extraction with Lixto. Proceedings of the 27th VLDB Conference, Roma, Italy, 2001.
J. Bilmes. What HMMs can do. UWEE Technical report, UWEETR-2002-2003, 2002.
M. E. Califf and R. J. Mooney. Relational Learning of Pattern-Match Rules for Information Extraction. In Working Notes of AAAI Spring Symposium on Applying Machine Learning to Discourse Processing, pp. 6-11, Menlo Park, CA, 1998. AAAAI Press.

(Continued)

*Primary Examiner*—Khanh B Pham
*Assistant Examiner*—Johnese Johnson

(57) ABSTRACT

An system for segmenting strings into component parts for use with a database management system. A reference table of string records are segmented into multiple substrings corresponding to database attributes. The substrings within an attribute are analyzed to provide a state model that assumes a beginning, a middle and an ending token topology for that attribute. A null token takes into account an empty attribute component and copying of states allows for erroneous token insertions and misordering. Once the model is created from the clean data, the process breaks or parses an input record into a sequence of tokens. The process then determines a most probable segmentation of the input record by comparing the tokens of the input record with a state models derived for attributes from the reference table.

31 Claims, 5 Drawing Sheets

OTHER PUBLICATIONS

S. F. Chen and J. Goodman. An Empirical Study of Smoothing Techniques for Language Modeling. In Proceedings of the 34th Annual Meeting of the ACL, pp. 310-318, Jun. 1996.

M. Collins and Y. Singer. Unsupervised Models for Named Entity Classification. In Proceedings of the Conference on Empirical Methods in Natural Language Processing, 1999, pp. 100-110.

V. Crescenzi, G. Mecca, and P. Merialdo. RoadRunner: Towards Automatic Data Extraction From Large Web Sites. Proceedings of the 27$^{th}$ VLDB Conference, Roma, Italy, 2001.

J. Droppo, L. Deng, and A. Acero. Evaluation of the Splice on the Aurora 2 and 3 Tasks. Microsoft Research, pp. 29-32.

S. Fine, Y. Singer, and N. Tishby. The Hierarchical Hidden Markov Model: Analysis and Applications. Machine Learning, 32(1):41-62, 1998.

D. Freitag and A. McCallum. Information Extraction with HMM Structures Learned by Stochastic Optimization. In AAAI/IAAI, pp. 584-589, Copyright 2001.

R. Grishman. Information Extraction: Techniques and Challenges. In Information Extraction (International Summer School SCIE-97). Springer-Verlag, 1997.

M. A. Hernandez and S. J. Stolfo. Real-World Data is Dirty: Data Cleansing and the Merge/Purge Problem. Data Mining and Knowledge Discovery, 2(1):9-37, 1998. © 1998 Kluwer Academic Publishers, Boston. Manufactured in The Netherlands.

C. A. Knoblock, K. Lerman, S. Minton, and I. Muslea. Accurately and Reliably Extracting Data From the Web: A Machine Learning Approach. IEEE Data Engineering Bulletin, 23(4):33-41, 2000. Copyright 1999 IEEE.

M. Lapata. Probabilistic Text Structuring: Experiments with Sentence Ordering. In Proceedings of the 41st Annual Meeting of the Association for Computational Linguistics, Jul. 2003, pp. 545-552.

A. F. Martin and M. A. Przybocki. NIST 2003 Language Recognition Evaluation. In Eurospeech 2003, 2003.

A. Mikheev, M. Moens, and C. Grover. Named Entity Recognition Without Gazetteers. In Proceedings of EACL, 1999.

L. R. Rabiner. A Tutorial on Hidden Markov Models and Selected Applications in Speech Recognition. Proceedings of the IEEE, vol. 77 No. 2, Feb. 1989. pp. 257-286.

K. Seymore, A. McCallum, and R. Rosenfeld. Learning Hidden Markov Model Structure for Information Extraction. In AAAI 99 Workshop on Machine Learning for Information Extraction, 1999.

* cited by examiner

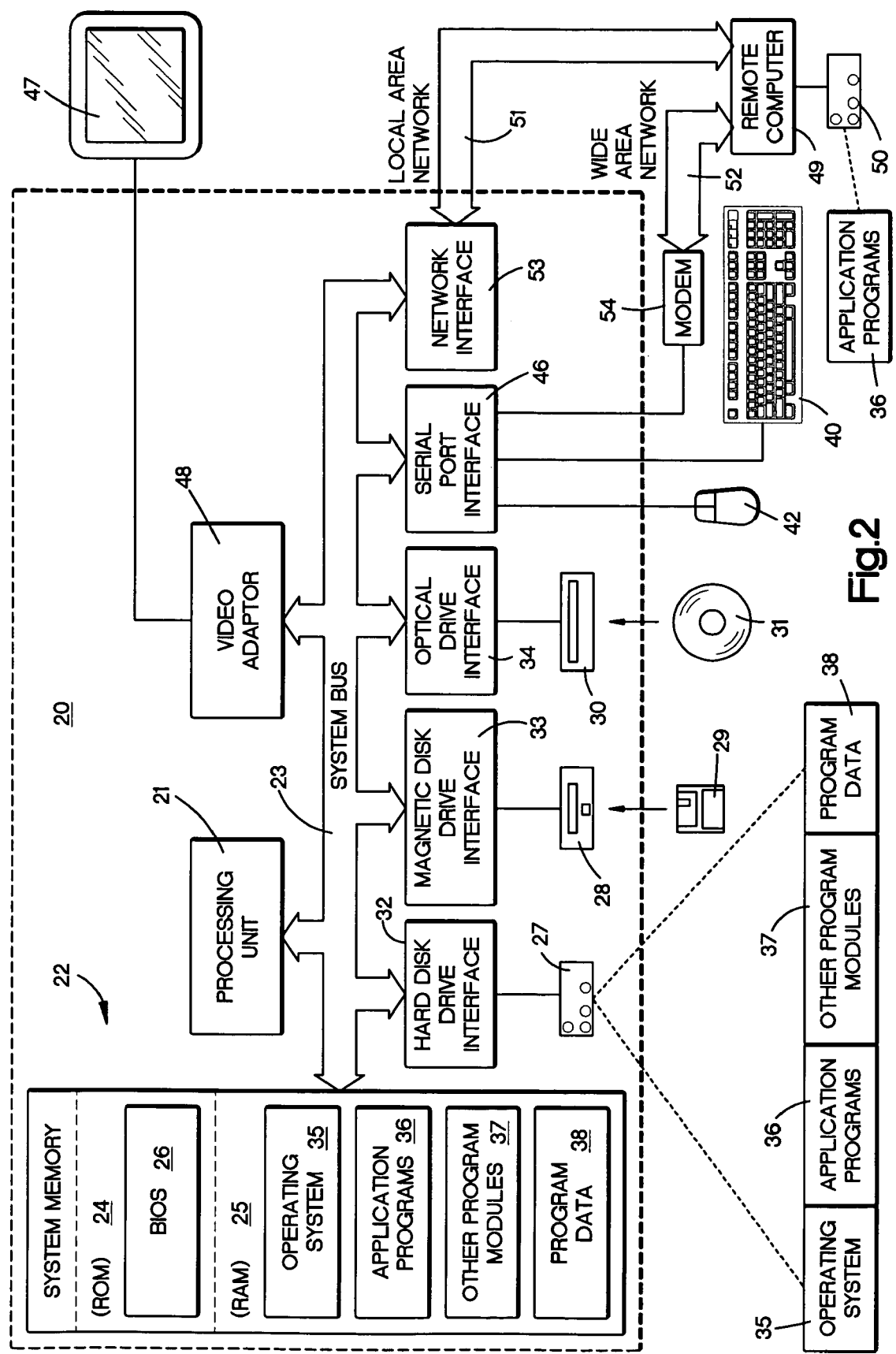

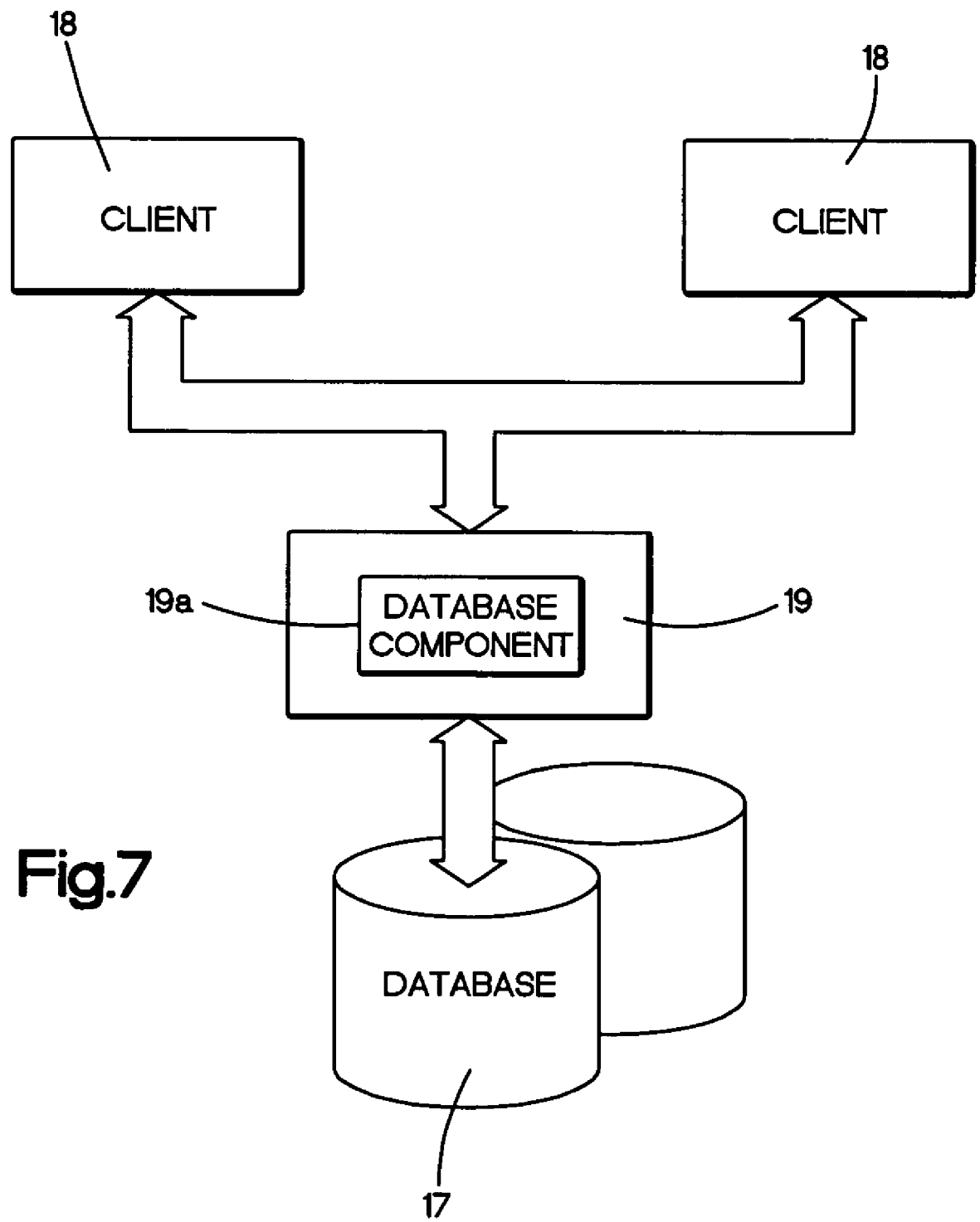

SEGMENTATION OF STRINGS INTO STRUCTURED RECORDS

FIELD OF THE INVENTION

The present invention concerns automated segmentation of data into segments such as in use in segmenting text into strings for storing in a database.

BACKGROUND ART

Unstructured text contains information which may be more meaningful if it is converted to a structured representation in order to enable effective querying and analysis. For example, addresses, bibliographic information, personalized web server logs, and personal media filenames are often created as unstructured strings that could be more effectively queried and analyzed when imported into a structured relational table. Building and maintaining large data warehouses by integrating data from several independent sources, some of which may provide unformatted strings, requires conversion into structured records before loading the data into relations.

The process involves segmenting unstructured strings into a target relational schema in order to populate a relation. Given a target schema consisting of N attributes, the goal is to partition the string into N contiguous sub-strings and to assign each of the sub-strings to a unique attribute of the schema. For instance, segmenting the input string "Segmenting text into structured records V. Borkar, Deshmukh and Sarawagi SIGMOD" into a bibliographic record with schema [Authors, Title, Conference, Year] requires the assignment of the sub-string "V. Borkar, Deshmukh and Sarawagi" to the Authors attribute, the sub-string "segmenting text into structured records" to the Title attribute, "SIGMOD" to the Conference attribute, and a NULL value to the Year attribute.

Known techniques for automatically segmenting input strings into structured records can be classified into rule-based and supervised model-based approaches. Rule-based approaches, mostly adopted by commercial systems, require a domain expert to design a number of rules and deploy them. This approach does not scale as deployment for each new domain requires designing and deploying a new set of rules. Also, it is hard for a human to be comprehensive. Supervised approaches alleviate this problem by automatically learning segmentation models from training data consisting of input strings and the associated correctly segmented tuples. It is often hard to obtain training data, especially data that is comprehensive enough to illustrate all features of test data. This problem is further exacerbated when input test data is error prone since it is much harder to obtain comprehensive training data that effectively illustrates all kinds of errors. These factors limit the applicability and the accuracy of supervised approaches. Ideally, a segmentation technique should require as little "manual training" effort as possible because it is hard to collect good and comprehensive training data.

Properties of semi-structured text have been exploited in recent work on wrapper induction, allowing these systems to automatically induce wrappers for web pages. Other work seeks to extract names of entities from the natural language text (e.g., names, locations, organizations). Detecting entities in natural language text typically involves disambiguating phrases based on the actual words in the phrase, and the text context surrounding the candidate entity. Explored approaches include hand-crafted pattern matchers, and other machine learning approaches.

Information extraction and named entity recognition research focuses on natural language text. In database attributes, the input strings are short and typically not grammatical. The known techniques used in named entity tagging and wrapper induction are not useful.

Hidden Markov Models (HMMs) are popular machine learning models, and have been used extensively in information extraction and speech recognition. Since the structure of HMMs is crucial for effective learning, optimizing HMM structure has been studied in the context of information extraction and speech recognition. Specifically, the nested HMM structure chosen by Borkar et al. ("Automatic segmentation of text into structured records." SIDMOD conference 2001) has been theoretically shown to be effective for some tasks if enough training data is available. As discussed earlier, obtaining comprehensive training data that illustrates all characteristics and variety of errors that would be observed in input strings is difficult.

The problem of robustness to input errors has long been a problem in speech recognition. Some approaches include filtering out noise during pre-processing and training the system in artificially noisy conditions (error injection). Noise filtering from speech recognition cannot be adapted to text segmentation directly, since the input errors are not separable from actual content.

SUMMARY OF THE INVENTION

The exemplary system and method are used to automatically segment data, even data that contains errors. One embodiment provides a system and method for unsupervised text segmentation. The system utilizes a reference table or relation, but does not require explicitly on labeled data while building accurate and robust data models for segmenting input strings into structured records.

A representative system exploits an existence of a reference relation or table having clean records or tuples that would typically be available in data warehouses. Such reference relations are a source of rich vocabularies and structure which can be exploited to develop a robust segmentation model.

One exemplary system evaluates an input string to segment the input string into component parts by use of a state transition model based on an existing collection of data records. The state transition model defines probabilities for segmenting input strings into component parts. The probabilities in the state transition model are adjusted to account for erroneous token placement in the input string. A most probable segmentation of the input string is determined by comparing the tokens of the input string with a state transition model derived from the collection of data records.

An alternate exemplary system segments string records into component parts for use with a database management system. A reference table of string records are segmented into multiple substrings corresponding to database attributes. The substrings within an attribute are analyzed to provide a state model that assumes a beginning, a middle and an trailing token topology for that attribute. The topology also accepts a null token to take into account an empty attribute component. Once the model is created from the clean data, the process breaks or parses an input string into a sequence of tokens. The process then determines a most probable segmentation of the input string by comparing the order of the tokens of the input string with a state models derived for attributes from the reference table.

Other details of the exemplary systems and methods are described in greater detail in conjunction with the accompanying drawings.

BRIEF DESCRIPTION OF THE DRAWINGS

FIG. 2 is a schematic depiction of a computer system for implementing an exemplary embodiment of the invention;

FIG. 7 is a schematic depiction of a client-server system for use with an exemplary embodiment of the invention.

EXEMPLARY EMBODIMENT FOR PRACTICING THE INVENTION

Consider the data contained in a representative customer table (Table 1) of data that has been stored in a data warehouse. The data is segmented into different attributes that are labeled in column headings. The entries of the first few representative rows are clean data in the sense that the data contained therein is presumed accurate. A challenge of the invention is to scan an input string and properly evaluate its contents for segmentation and insertion into the Table 1 representation.

TABLE 1

| RecNo | Name | Address 1 | City | State | Zip Code |
|---|---|---|---|---|---|
| 0001011 | Jones' Bakery | 89 Elm St | Perry | New York | 18008 |
| 0001012 | Al Smith | 10 Jackson blvd. | Timbuktoo | AZ | 88045 |
| 0001013 | WalMart | 20205 S. Randall Ave. | Madison | WI | 53715 |

Figure 1:
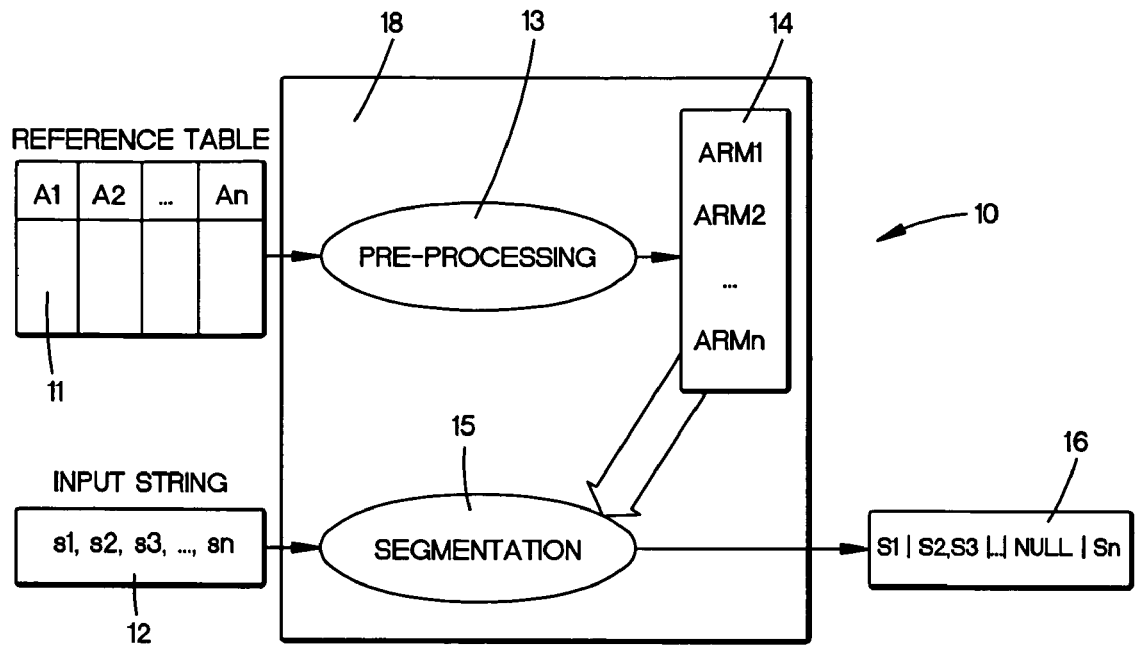
FIG. 1 is a schematic depiction of an exemplary segmentation process for interpreting input data.

A system 10 for automatic segmentation is depicted in FIGS. 1 and 7. Inputs to the system are a reference table 11 containing data similar to the data of Table 1 above and an input string 12 which must be segmented and added as a record to the customer table. The system analyses these two inputs in two phases. A pre-processing component 13, of a client 18 10 builds a number of attribute recognition models (ARMs) 14, one for each column (or attribute) in the reference table 11. These attribute recognition models determine the probability with which a (sub-)string from the input string or tuple 12 belongs to that column.

As an example, an attribute recognition model on the "Zip Code" column of a customer relation or table could indicate that the probability of being a valid zip code is 0.95 whereas that of Timbuktoo is only 0.005. Models on all columns can be used together to determine the best segmentation of a given input string into sub-strings. In a second run-time segmentation phase 15, the system segments an input string s into its constituent attribute values $s_1, s_2, \ldots s_n$ and assigns each substring $s_i$ to a distinct column or attribute such that the quality of the segmentation is the best among all possible segmentations.

Building segmentation models from clean standardized information in a large reference table presents certain problems. One challenge is that information in reference relations is typically clean whereas input strings usually consist of a variety of errors: missing values, spelling errors, use of inconsistent abbreviations, extraneous tokens, etc. The exemplary system must learn from clean reference data segmentation models that are robust to input errors. Prior art supervised approaches do not face this problem as they assume that training data comprehensively illustrates all types of errors observed in typical input data.

An additional challenge is that the order in which attribute values in an input string are specified can be different for different data sources. In a data warehouse maintenance scenario, the order in which attribute values are concatenated by some address data sources may be [Name, City, Zip, State, Address] while another source may concatenate it in the order [Name, Address, City, Zip, State]. Often, even data in different batches from the same source may consist of different orders. Another common example is bibliographic data: some sources may order attributes for each article as [authors, title, conference, year, pages] while other sources may order them as [title, authors, conference, pages, year]. Therefore, for an unsupervised segmentation system to be deployed over a variety of data sources it has to deal with differences in input orders by automatically detecting the order.

An additional challenge is that reference tables can usually be very large and consist of millions of records or tuples. Consequently, any process that builds a segmentation model from large reference tables has to be efficient and scalable to effectively exploit large vocabularies and rich structural information in large reference tables. In contrast, hand-labeled training data typically used by supervised approaches is much smaller due to the inherently slow and time-consuming human labeling phase in its preparation.

Consider an input string "Walmart 20205 S. Randall Ave Madison 53715 Wis." which has to be segmented into Organization Name, Street Address, City, State, and Zipcode attribute values. The association of sub-strings "Walmart" and "Walmart 20205" with the organization name attribute may be assigned probabilities 0.9 and 0.25, respectively, by the organization name attribute recognition model 14. If the combination (say, product) of individual probabilities of the segmentation "walmart" as Organization Name, "20205 s. randall ave" as Street Address, "madison" as City, "53715" as Zipcode, and "WI" as State values has the highest numeric value, the system outputs a segmented tuple 16 as a segmentation of the given input string 12.

The system 10 for processing input strings 12 can be used in a client/server computing environment such as the system shown in FIG. 7. The input strings are segmented into output records 16 and stored into a database 17 which includes at least one reference table 11. The input strings can be gathered or provided to one of a number of clients 18 which transmit the records to a server 19. A database management component 19a stores records organized into relations wherein data records within a relation are organized into a number of attributes.

A model building or preprocessing component 13 builds a number of attribute recognition models based on an existing relation of data records, wherein one or more of said attribute recognition models includes probabilities for segmenting input strings into component parts which adjusts said probabilities to account for erroneous entries within an input string. A segmenting component 15 receives an input string and determines a most probable string segmentation by evaluating transition probabilities of states within the attribute recognition models built by the model building component 13.

Computer System

An exemplary system 10 is implemented as a client application that accesses a database reference table 11 maintained on a server computer 19 running a database management system 19a such as SQLServer® or the like. While the client application could be executing on the server computer, an alternative possibility is that the client application is executing on a separate client computer FIG. 2 depicts an exemplary data processing system which can implement both the database management server computer and the client. The FIG. 2 data processing system includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other interface hardware for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Attribute Recognition Model:

An attribute recognition model $ARM_i$ for the attribute $A_i$ is a model for the domain of $A_i$ such that $ARM_i(r)$ for any given string r is the probability of r belonging to the domain of $A_i$.

Optimal Segmentation of an Input String:

Let R be a reference relation with attributes $A_1, \ldots, A_n$ and $ARM_1 \ldots ARM_n$ be the respective attribute recognition models. Let $g: [0,1]^n \rightarrow [0,1]$ be a combination function. Given an input string s, the segmentation problem is to partition s into $s_1, \ldots, s_n$ and to map them to attributes $A_{s1}, \ldots, A_{sn}$ such that $g(ARM_{s1}(s_1), \ldots, ARM_{sn}(s_n))$ is the maximum among all partitions of s into n attribute values. The string is segmented into possible combinations of contiguous substrings and the ARM for each attribute is applied to each of the combinations. In the case where g is the product of probabilities, the optimal segmentation is characterized by the maximum product of the probabilities of the multiple ARMs.

Note that the order of attributes $A_{s1}, \ldots, A_{sn}$ may be different from the order of the attributes $A_1, \ldots, A_n$ specified in the reference table. Attribute constraints for R (e.g., maximum attribute length) can be easily incorporated into this model. The combination function g can also incorporate the information about the order in which attribute values are usually input. For example, if it is known that the street address value usually follows the name attribute values, the system can bias the assignment of consecutive sub-strings, say "Walmart" and "20205 S. Randall Ave," to name and street address attributes, respectively.

Notation

Let tok be a tokenization function which splits any string into a sequence tok(s) of tokens based on a set of user-specified delimiters (say, whitespace characters). The token vector of a string s is the vector of all tokens in s. For example, tok(v[1]) of the tuple [Boeing Company, Seattle, Wash., 98004] is [boeing, company], and boeing, company is the token set. Case can be ignored while generating tokens. The dictionary $D_i$ of the attribute $A_i$ of R is the union of token sets of all attribute values in the projection R[i] of R on $A_i$. The exemplary system only segments strings at token boundaries.

Hidden Markov Models

Figure 3:
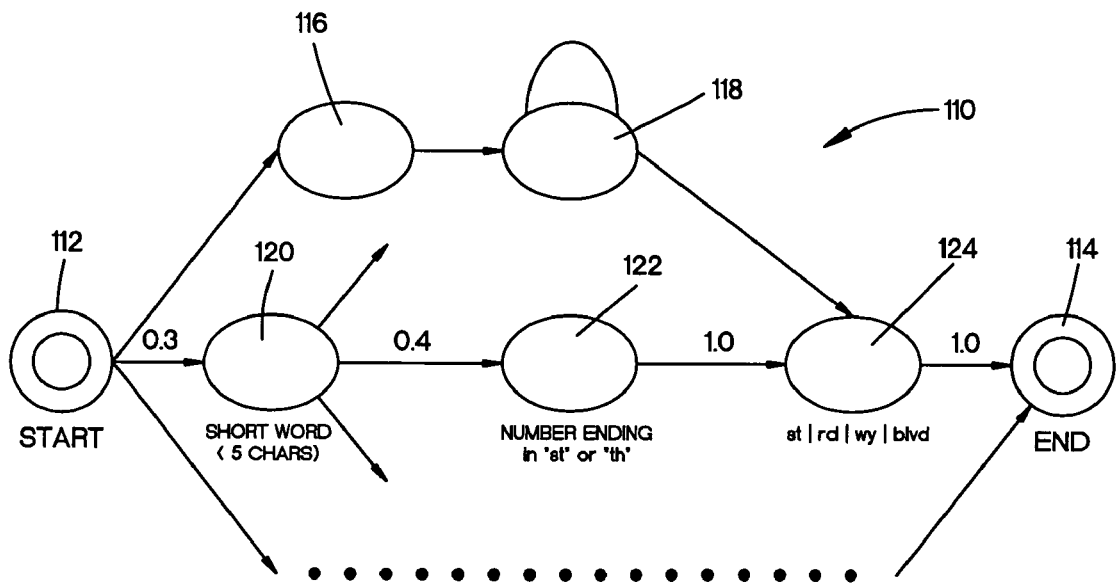
FIG. 3 is a schematic depiction or an attribute recognition model for use with the exemplary embodiment of the invention.

A Hidden Markov Model (HMM) is a probabilistic finite state automaton encoding the probability distribution of sequences of symbols each drawn from a discrete dictionary. FIG. 3 shows an example HMM 110. For a sequence s of symbols each drawn from the probability distribution encoded by a HMM, the system computes a probability of observing s. The HMM 110 comprises a set of states and a dictionary of output symbols. Each state can emit symbols from the dictionary according to an emission probability distribution for that state and pairs of states are connected by directed edges denoting transitions between states. Further, edges are associated with transition probabilities. HMMs have two special states: a start state 112 and an end state 114. As described below, a Hidden Markov model used with the exemplary embodiment will typically include many more states than the model 110 shown in FIG. 3.

The probability of observing a string $s=o_1, \ldots, o_k$ of symbols drawn from the dictionary, is the sum of probabilities of all paths from the start state to the end state with k transitions. The probability of any path p is the product of all transition probabilities on each transition in p and the emission probabilities of observing the $i^{th}$ symbol $o_i$ at the $i^{th}$ state on p. The path with the highest probability is usually considered the path that generated the string s.

The set of states and the set of transitions together constitute the topology of a HMM. For any given application, the topology is usually fixed a priori. The emission and transition probabilities are then learned during a training phase over the training data.

Figure 6:
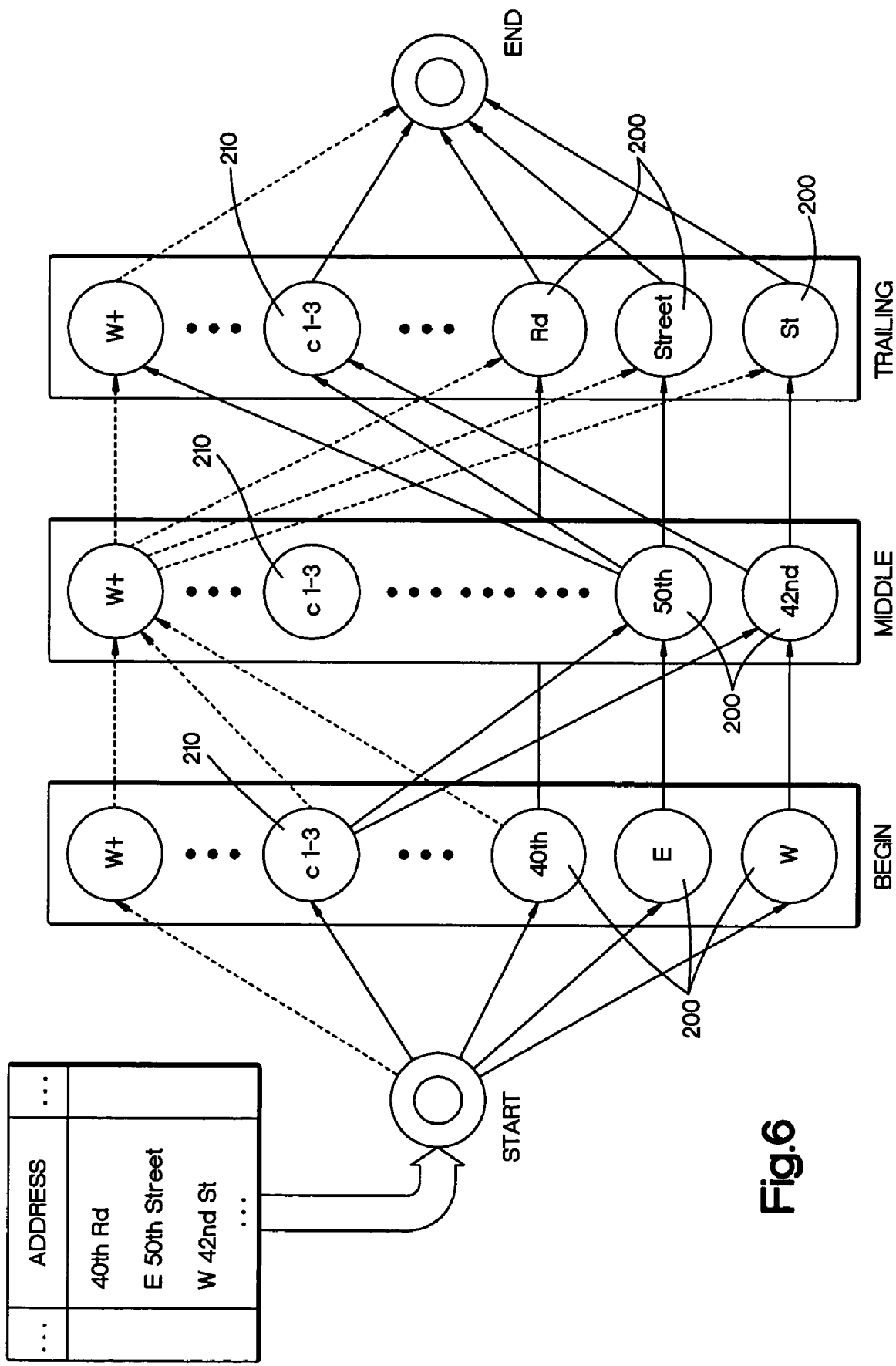
FIG. 6 is a depiction of a hierarchy of states within an attribute recognition model.

Feature Hierarchy:

A Hidden Markov Model built over a dictionary of an attribute cannot be used for computing probabilities of sequences of tokens containing tokens not in the dictionary. However, the set of base tokens in a dictionary can be generalized to recognize such unobserved tokens. For example, it may be sufficient to see a 5-digit number optionally followed by a 4-digit number to recognize zip codes without requiring the exact zip code be used to build the model. The generalization is usually encoded as a feature hierarchy. An example hierarchy is shown in FIG. 6. The exemplary system uses a feature hierarchy wherein lower levels of the feature hierarchy are more distinctive than higher levels. At the top level there is no distinction amongst symbols; at the next level they are divided into classes "numbers," "words," and "delimiters." "Numbers" and "words" are then divided into sub-classes based on their lengths. For example, class of words consisting of 10 or less characters (denoted c[1-10]) is above a class of words consisting of 3 or less characters (denoted c[1-3]).

All base tokens are at the leaf levels of the feature hierarchy. To distinguish base tokens from the generalized elements, refer to the non-leaf elements in the feature hierarchy as feature classes. A token t minimally belongs to a feature class f if t belongs to f but not to any feature class that is a descendant of f. For example, the zipcode value 21934 is said to minimally belong to the feature class 5-digit numbers.

Generalized Dictionary:

A generalized dictionary consists of all elements in the feature hierarchy in addition to the dictionary of base tokens. Formally, the generalized dictionary of an attribute $A_i$ in R is the union of the dictionary $D_i$ of $A_i$ and the set FH of feature classes in the feature hierarchy. Unless otherwise noted, the term dictionary is used herein to denote the generalized dictionary.

Attribute Recognition Models

One feature of the exemplary system is an efficient construction of robust attribute recognition models from a reference relation 11. Attribute recognition models are instantiations of hidden markov models. Instantiating a hidden markov model requires definition of (i) a topology consisting of a set of states and the set of transitions among them, and (ii) emission probability distributions at each state and the transition probabilities between states. Instantiating ARMs and the computation of emission and transition probabilities is part of the Pre-processing phase 13. A goal is (i) to improve the robustness of segmentation to input errors, and (ii) to develop an efficient and scalable process for building robust attribute recognition models.

Attribute recognition models, quantitatively distinguish sequences of tokens according to their likelihood of belonging to an attribute domain. They assign higher probabilities to those sequences that are more likely to be from an attribute. A more "specific" attribute recognition model is more selective in assigning higher probabilities, i.e., it assigns higher probabilities only to very few selective token sequences. ARMs are specific in three aspects: positional specificity, sequential specificity, and token specificity.

Consider the ARM structure 110 in FIG. 3. This arm structure has a start and end states 112, 114 and a number of intermediate states 116, 118, 120, 122, 124. Requiring that a token in the street address value ending in "th|st" can only be in the second position indicated by the state 122 is an example of positional specificity. The probability of acceptance is much lower if such a token ending in "th|st" appears in the third position instead of the second position. A token ending in "th" or "st" can only follow a short word (less than five characters) and tokens "st, rd, wy, blvd" can only follow a token ending in "th" or "st" are examples of sequential specificity. Note, that sequential specificity stresses the sequentiality—of a token following another. That the last state 124 can only accept one of "st, rd, wy, blvd" is an example of token specificity. Even though highly specific models may be required for some applications, attribute recognition models need only be specific to the extent of being able to identify an attribute value as belonging to the correct attribute and distinguish it from other domains. Moreover, being overly specific in recognizing attribute values may cause the attribute recognition model to reject (i.e., assign very low probability) attribute tokens having errors, thereby forcing some of these tokens into other columns resulting in incorrect segmentations. It is possible that the ARM can trade off specificity for achieving robustness to input errors. However, in constructing an ARM one challenge is to make the tradeoff without losing segmentation accuracy and at the same time being able to build the model efficiently.

Features of the exemplary system are (i) the adoption of a fixed topology for efficiently building attribute recognition models from large reference tables and for gaining robustness by relaxing positional specificity, (ii) assigning a single state for each base token to more accurately capture transition probabilities, and (iii) relaxing sequential specificity for gaining robustness to common input errors.

ARM Topology

The topology of a hidden Markov model, consisting of the set of states and valid transitions between these states, can greatly affect the accuracy of the model. The exemplary embodiment utilizes a topology dependent on the reference data that (i) enables efficient model building and (ii) relaxes positional specificity in favor of robustness to input errors.

Collapsing positional information into a small number of distinct categories results in a more flexible, compact, and robust ARM topology. More specifically, the exemplary embodiment categorizes tokens in attribute values into three positions: Beginning, Middle, and Trailing positions, resulting in what is referred to as the BMT topology 130, shown in FIG. 4. Consider a string "57th nw 57th st" with the intent that this constitute a street address. The token "57th" is categorized as beginning token, "st" as the trailing token, and the rest as middle tokens. In strings with less than three tokens, the system assigns tokens to multiple ones of these positions.

Collapsing token positions into these three categories gains efficiency while building ARMs. It also gains robustness to several common types of input errors—token deletions, token insertions, and token re-orderings. For example, the probability of observing a token '57$^{th}$' as the second or third token in "nw 57th 57th st" is the same for both occurrences of the token. The system is still specific about the positionality of the beginning and trailing tokens because these tokens are used to correctly recognizing boundaries between attribute values. By not grouping boundary tokens with the middle tokens, the system can collect more specific statistics on the emission and transition probabilities for boundary tokens (beginning and trailing). This simple fixed ARM topology captures the salient structure required for robust segmentation.

The categorization of tokens into positions induces a categorization on the (generalized) dictionary of an attribute. The dictionary $D_i$ corresponding to an attribute $A_i$ is now categorized into the beginning, middle, and trailing dictionaries $D_i^B$, $D_i^M$, and $D_i^E$. For example, a token occurring in the beginning position of an attribute value of any tuple in a relation R belongs to the $D_i^B$ dictionary. The fact that a token appears in one dictionary does not preclude it from occurring in a second.

Figure 5A:
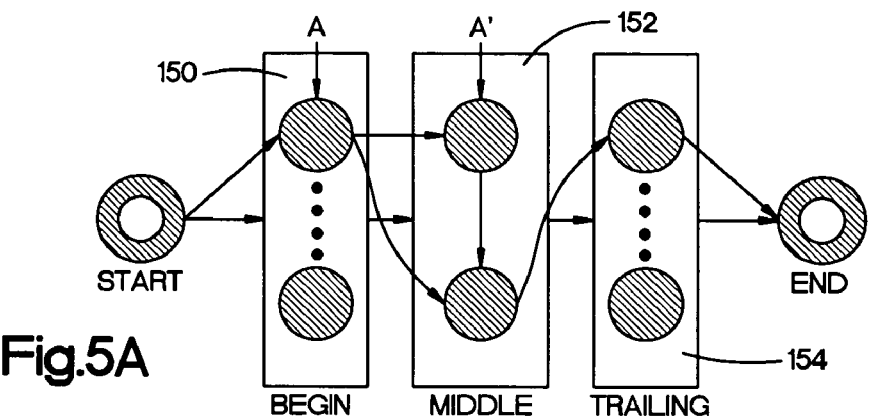
FIGS. 5A, 5B and 5C depict modifications to the attribute recognition model of FIG. 4 to make the recognition process more flexible within an attribute.
Figure 5B:
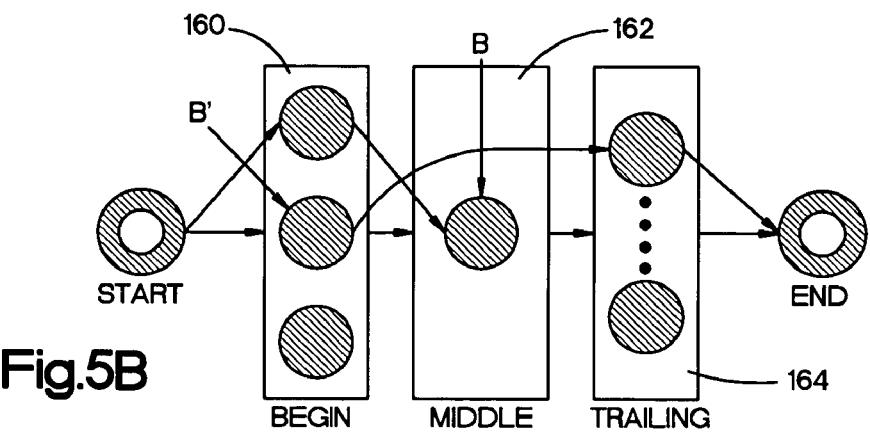
Figure 5C:
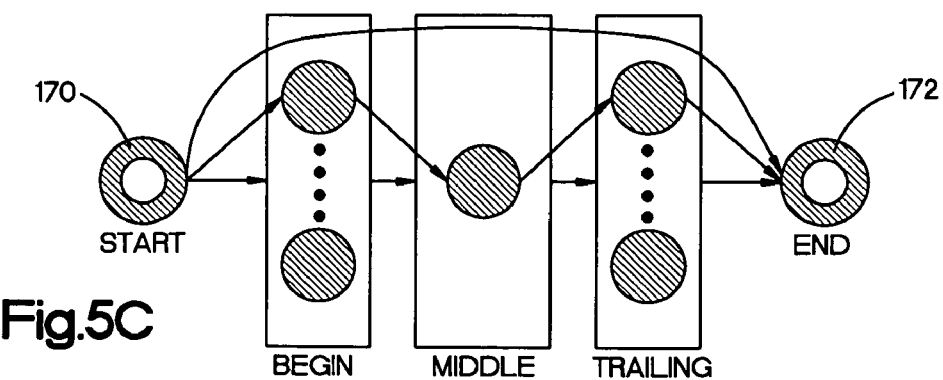

Set of States and Possible Transitions:

The set of states in an ARM model are also categorized into beginning, middle, and trailing states. Each category consists of a state s for each element e (base token or feature class) in the corresponding categorized (generalized) dictionary, and s emits only e with non-zero probability. The union of all three categorized states along with the special start and end states constitutes the set of states in the attribute ARM. The broad structure of the set of allowed transitions is shown in FIGS. 5A-5C.

Figure 4:
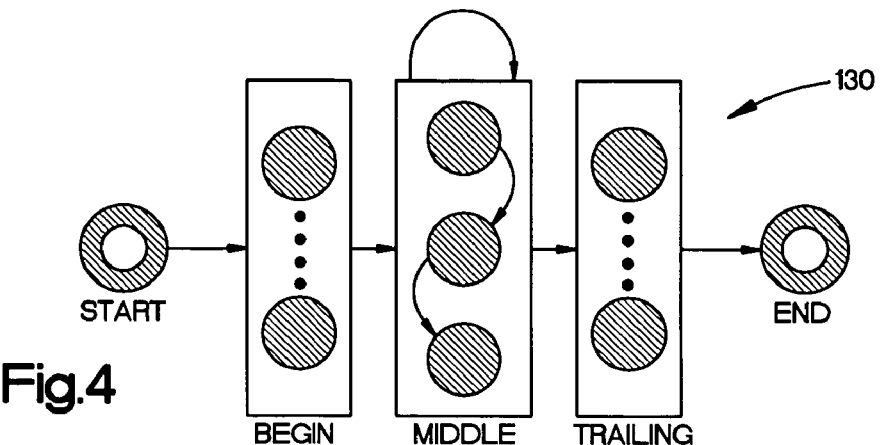
FIG. 4 is a schematic depiction of an attribute recognition model suited for recognizing string attributes of a database.

Each category—beginning, middle, and trailing—may consist of several states in the HMM but the transitions among these state categories are restricted to non-backward transitions, as indicated by the arrows in FIG. 4. That is, beginning states can only transition to either middle, or to trailing, or to the end states. Middle states can transition to middle, or to trailing, or the end states. Trailing states can only transition to the end state.

By assigning a state to each token or feature class, the system encodes transition probabilities more accurately than the usually adopted approach grouping all base tokens into one state. For example, grouping base tokens "st, hwy" into one BaseToken state also collapses all transitions from previous states (say, "49th, hamilton, SR169") to any of these individual tokens into one transition. It is possible that the states (e.g., "SR169") transitioning into the token "hwy" are very different from the states (e.g., "49th, hamilton") transitioning into the token "st." Grouping several base tokens into one BaseToken state loses the ability to distinguish among transitions. Therefore, the system associates one base token per state. The cost of associating a token per state is that the number of transitions increases. However, experience with the exemplary system indicates that the ARM models fit in a typical computer's main memory and hence the increase is not an issue in practice.

Emission and Transition Probabilities:

To complete the instantiation of an attribute recognition model $ARM_i$ on attribute $A_i$, emission probabilities must be defined at each state and the transition probabilities between states. Since the system associates a state s per element (base token or feature class) e in the categorized feature hierarchy, the emission probability distribution at s is: $P(x|e)=1$ if $x=e$ and the position of x with $ARM_i$ and that of e within the attribute value are identical, and 0 otherwise. There is a learning algorithm for learning, during the pre-processing phase, the transition probability distribution from the reference table. In describing the relaxation of sequential specificity for robustness, it is assumed that these probabilities are known.

Sequential Specificity Relaxation

Consider the example path in FIG. 3 consisting of a "short word," a "number ending in th or st," and a token in the set rd, wy, st, blvd, which accepts the string "nw 57th st" with a high probability. However, its erroneous versions "57th st," "nw57th st," "nw 57th," "nw 57th 57th st" have low acceptance probabilities. The primary reason for low acceptance probability is the sequential specificity of the model in FIG. 3: that a specific token has to follow another specific token. Therefore, erroneous transitions (from the state accepting "57th" to the end state, from the start state to the state accepting "57th") have a very low probability. A naive approach of increasing all transition probabilities between states will result in accepting all sequences of tokens even those from different columns thus decreasing the accuracy of the ARMs. Therefore, the challenge is to adjust transition probabilities without deteriorating the accuracy of segmentation.

The exemplary approach for trading sequential specificity for robustness is to "adjust" attribute recognition models trained on clean data to deal with some of the commonly observed types of errors: token insertions, token deletions, and missing values. In the above example, the adjusted attribute recognition model also accepts the erroneous versions (e.g., "57th st") of the correct string "nw 57th st" with higher probabilities without significantly increasing the probability of acceptance for arbitrary sequences of tokens.

The exemplary adjustment operations simulate the effects of errors on token sequences, and adjust an ARM's transition probabilities accordingly. For example, in order to accept the erroneous version "57th st" of "nw 57th st" there must be a state s in the beginning category of states which can accept "57th" and then be able to transition to the state accepting "st" in the trailing category of states. To achieve this relaxation, the state accepting the token "57th" from the middle category is copied along with its incoming and outgoing transitions to the beginning category. Since it is desirable to do this for all possible middle states, the exemplary system, when building an ARM the exemplary system copies all of the middle states into the beginning category.

Observe that the system does not need to actually generate erroneous data but only operate on the ARM obtained from clean data. Even though the adjustment operations impact the positional information of the ARM they still distinguish between start and end positions, which completely aligns with the goals of the begin-middle-trailing topology. Adjustment operations increase the numbers of states and transitions in the ARM. In one embodiment, in order to limit the increase, an intuition that correctly recognizing beginning and trailing positions is more important than the middle positions leads to the adoption of limiting the adjustment operations to those involving the beginning and trailing states.

The adjustment operations over the ARMs improve robustness to token insertion, token deletion, and missing value errors. These adjustments are implemented by copying states in the ARM, together with their associated incoming and outgoing transitions and probabilities. This adjustment of the ARMs to simulate input errors is enabled by the uniform topology (involving only a fixed number of positional categories) adopted for any ARM.

Insertions, Deletions, and Missing Values

Token Insertions: The adjustment on an ARM with respect to token insertions copies states and transitions as illustrated in FIG. 5A. For example, transitions to and from the original state A in the beginning position 150 are "copied" to the corresponding state A' in the middle position 152. A' accepts the same set of tokens as A, but only if these tokens appear in the middle position. Similarly, the states originally in the trailing position 154 are copied to the middle position (anticipating potential token insertions after the actual trailing token).

Token Deletions: The adjustment operation on an ARM with respect to token deletions is illustrated in FIG. 5B. This example illustrates token deletion from the beginning position 160. Intuitively, if a beginning token is deleted the following middle state shifts to the beginning position. Therefore, one solution is to copy transitions to and from the original state B in the middle position 162 to a (new) beginning position state B', which accepts the same class of tokens as the original state B, but only if they appear in the beginning position. Similarly, states in the middle position 162 are copied to the trailing position 164 anticipating token deletions in the trailing position.

Missing Column Values: This transformation increases the probability of "skipping" from the Start 170 directly to the End state via the special EmptyValue state (See FIG. 5C). Note that if the (clean) reference data does not have any missing values the system must estimate the transition probabilities to and from this new state. These (unseen) transitions are estimated using a Good-Turing estimate, one of the well known smoothing methods (e.g., S. Chen and J. Goodman, An empirical study of smoothing techniques for language modeling. In *Proceedings of the 34th Annual Meeting of the ACL*, pages 310-318, 1996).

Other common errors, i.e., spelling errors and token re-orderings are addressed by other characteristics of ARMs. Spelling errors are handled through token specificity relaxation via the feature hierarchy: spelling errors are not likely to affect the character class of the token and therefore are likely to match the appropriate class level in the feature hierarchy. Similarly, the begin-middle-trailing topology is designed to be robust to token re-orderings, especially, those in the middle position.

Example of ARM Using a Sample Feature Hierarchy

Consider an exemplary approach for relaxing token specificity depicted in FIG. 6. The essential insight (first introduced in Borkar et al.) is to generalize base tokens 200 observed in the reference table to generalized feature classes 210 in a feature hierarchy. The advantage is that when a new base token t (or one for which information is not maintained in the attribute recognition model due to memory constraints imposed by the size of the reference relation R) is encountered in the input string s, the token is generalized to the next higher level feature class for which emission and transition probabilities are maintained. That is, t is mapped to the minimal feature class that accepts it. Note, in the FIG. 6 depiction each of the beginning, middle and trailing positions has a 'catchall' state W+ that accepts any token with a small transition probability from the previous state. This allows the ARM to deal with totally unexpected tokens and produce a result, which is usually correct.

ARM Training

Consider the training procedure for computing transition probabilities between states in the exemplary topology. To illustrate the training procedure refer to FIG. 6.

The exemplary process assigns probabilities that estimates that the transition between tokens occurs in the target attribute, and not in other attributes. In contrast, traditional approaches for learning transition probabilities in HMMs usually use a form of a generative model approach for determining transition probabilities. That is, the generative transition probability between two states $s_1$ and $s_2$ in $ARM_i$ is the probability of observing token pairs $t_1$ and $t_2$ that can be emitted from $s_1$ and $s_2$, respectively. However, this approach results in transitions between higher level feature classes (e.g., transitions between the w+ states that accept any token) getting very high probabilities even though such transitions are not useful for distinguishing an attribute from other attributes.

Consider an erroneous bibliographic input string "editorial wilfred hodges of logic and computation" that has to be segmented into attributes [Title, Authors, Journal]. (Note, The original record before corruption was ["Editorial", "Wilfred Hodges", "Journal of Logic and Computation"].) Purely generative models tend to segment this string as ["editorial", "wilfred hodges of logic", "and computation"] because the token "and" of the input string generalizes to a three-character string which is often observed as the beginning token for a journal name (e.g., "ACM TODS"). In order to address this issue, the exemplary process modifies the transition probabilities to depend on both the generative probabilities and the ability to distinguish a particular attribute.

Intuitively, the approach is to assign higher probabilities to transitions that distinguish a particular attribute and lower probabilities to transitions that do not distinguish an attribute well. So, if a commonly observed transition between higher level feature classes is not distinctive of an attribute, the transition probability would be lowered. To define the transition probabilities between any two states, a few definitions are needed.

In the following description, let $s_1$ and $s_2$ be two states in the attribute recognition model $ARM_i$. Let the position $pos_i(s)$ of a state s denote the position—beginning, middle, or trailing—of s in $ARM_i$. The position pos(t,v) of a token t in an attribute string v is the position—beginning, middle, trailing—of the token t in the string v. Given two states $s_1$ and $s_2$, the transition $trans(s_1,s_2)$ from $s_1$ to $s_2$ is valid only if it is a non-backward transition. That is, (i) if $pos_i(s_1)$=beginning, then $pos_i(s_2) \in$ {middle, trailing, {END}}, (ii) if $pos_i(s_1)$=middle then $pos_i(s_2) \in$ {middle, trailing, {END}}, and (iii) if $pos_i(s_1)$=trailing then $pos_i(s_2) \in$ {END}.

Given an attribute value string v from the attribute $A_i$ and the states of $ARM_i$, we say that v supports a valid transition $t(s_1,s_2)$ if there exists a pair of consecutive tokens $t_1$ and $t_2$ in v such that $pos(t_1,v)=pos_i(s_1)$, $pos(t_2,v)=pos_i(s_2)$, and either $t_1$ and $t_2$ (i) are emitted with non-zero probability by $s_1$ and $s_2$, respectively or (ii) belong to the feature classes emitted by $s_1$ and $s_2$, respectively.

Positive Frequency: Given a reference table R, the positive frequency $f_i^+ (t(s_1,s_2))$ of a transition $t(s_1,s_2)$ with respect to attribute $A_i$ is the number of attribute values in the projection of R on $A_i$ that support $t(s_1,s_2)$. The positive frequency of all non-feasible transitions is 0.

Overall Frequency: Given a reference table R, the overall frequency $f(t(s1,s2))$ of a transition $t(s1,s2)$ is the number of attribute values from any attribute that support the transition $t(s1,s2)$. That is, $$f(t(s1, s2)) = \sum_i f_i^+(t(s_1, s_2)).$$

Generative Transition Probability: Given a reference table R, the generative transition probability $GP(t(s_1,s_2)|A_i)$ transition $t(s_1,s_2)$ with respect to an attribute $A_i$ is the ratio $$\frac{f_i^+(t(s_1, s_2))}{\sum_j f_i^+(t(s_1, s_j))}.$$

Transition Probability: Given a reference table R, the transition probability $P(t(s_1,s_2)|A_i)$ of a transition depends on its generative probability and its ability to distinguish attribute $A_i$. Assuming independence between the two aspects, one can compute the transition probability as the product:

$$A_i : GP(t(s_1, s_2) \mid A_i) * \frac{f_i^+(t(s_1, s_2))}{f(t(s_1, s_2))}.$$

The pseudocode for the training procedure is as follows.

| | |
|---|---|
| 1. | First Pass: Scan R, build Dictionary C. |
| 1a. | Prune Dictionary (f) |
| 2. | Second Pass: Scan R, compute transition frequencies |
| 3. | Generalize: Propagate base transitions up the hierarchy |
| 4. | Compute transition probabilities |
| 5. | Apply Robustness transformations |

The process first scans the reference table to build dictionaries (Step 1). It then performs another scan on the reference table to compute the positive and overall frequencies of all transitions (Step 2). It propagates base token statistics on base tokens 200 to transitions between more general states corresponding to feature classes 210 (Step 3). Finally, it calculates the actual transition probabilities (Step 4). Then the sequential specificity is relaxed (Step 5) as described above in relation to FIGS. 5A, 5B, 5C.

ARM Training Procedure

In summary, the features of ARMs are (i) the adoption of the previously described topology that allows efficient learning of the ARM from large reference tables and to gain robustness to input errors, (ii) the association of a state per base token to accurately encode transition probabilities and exploit large dictionaries, and (iii) the relaxation of sequential specificity by adjusting an ARM that is discerned from clean reference data.

The basic ARM model requires the system to maintain statistics about transitions between successive token pairs in any attribute value. In principle the number of transitions can be large. However, most domains tend to be sparse and only a small fraction of base token pairs actually correspond to observed transitions. Therefore, a sparse representation for ARMs where only the observed transitions are stored is very space efficient. A hash table is used where keys correspond to transitions between two states. Specifically, a transition between state $s_i$ and $s_j$ is encoded as the hash key obtained by concatenating the two state IDs. The transition probability can then be accessed in constant time by looking up the hash table. In addition to the compressed representation of the transition probability matrix, the system can further reduce space requirements by pruning attribute dictionaries to retain only the most frequently encountered base tokens. All the pruned tokens are generalized to more general feature classes 210. Keeping only the most frequent tokens reduces main memory requirements without significantly reducing segmentation accuracy.

Segmentation Process

Once the ARMs are defined in terms of quickly available transition probabilities between observed token and class states the system can segment an unknown string or series of strings. Consider the segmentation of the bibliographic string "Vinayak R. Borkar, K. Deshmukh, Sunita Sarawagi, Automatic Segmentation of Text into Structured Records, SIGMOD 2001" into the values for attributes [Conference, PaperTitle, Authors, Year, Pages]. In order to determine the best segmentation, the system must consider all possible segmentations of the input string. Since the order in which attribute values are concatenated in input strings is not known, all possible permutations of assignments of segments to attributes should be considered. The consideration of all possible permutations makes the segmentation problem very time consuming.

Observe that the segmentation problem has two components: first, determining the sequence in which attribute values are concatenated in an input string and second, determining the best segmentation of an input string into the corresponding sequence of attribute values. Previous supervised approaches learned the attribute value order from the training data. In fact, they allow the order to be probabilistic and model it using a hidden markov model. For instance, the author attribute immediately precedes the title attribute with probability 0.77 and the year attribute immediately precedes the booktitle attribute with probability 0.35. Once such a probabilistic order is known, a dynamic programming algorithm due to Viterbi was used to determine the best segmentation. See Borkar et al. as well as the book "Fundamentals of speech recognition" by Rabiner and Juang for more on the Viterbi algorithm.

The exemplary segmentation procedure first learns the attribute value order over a batch of input strings and then uses the determined order to optimally segment other individual strings that are presumed to conform to the attribute order of the batch of input strings.

Determining Attribute Value Order

The exemplary embodiment implements an efficient and accurate process for determining the probabilistic attribute value order in input strings. The process is based upon the observation that attribute value orders of input strings usually remain the same or similar for batches consisting of several input strings. For example, a data source for bibliographic strings may usually concatenate authors, title, conference name, year, pages in this order. Therefore, while segmenting, it is sufficient to recognize and recover this order once for the entire batch of input strings from this source. This is exploited by employing a heuristic process to determine the order within each input string in a batch and then aggregate it over the entire batch. Even if the heuristic order determination algorithm results in a limited number of errors over a few individual input strings, the aggregated result is still very accurate.

This is formalized in a procedure for determining the probabilistic order among attribute values within a batch of input strings. First estimate the probability of attribute $A_i$ preceding (not necessarily immediately) attribute $A_j$, and from the pairwise precedence estimates and determine the probability that an attribute $A_i$ immediately precedes attribute $A_j$.

Pairwise Precedence Estimates

The precedence estimate $prec(A_i,A_j)$ of an attribute $A_i$ preceding attribute $A_j$ is the fraction of input strings where the attribute value $A_i$ is encountered in a sting before the attribute for $A_j$ in that string. The precedence order among attributes for a single input string is determined as follows. For each attribute, determine the token in the input string s at which it is most likely to start. For a pair of attributes $A_i$ and $A_j$, if the token at which $A_i$ is expected to start precedes the token at which $A_j$ is expected to start, then we say that $A_i$ precedes $A_j$ with respect to the input string s.

For example, consider an input string consisting of 8 tokens "walmart 20205 s. randall ave madison 53715 wis." Compute an 8-coordinate vector [0.05, 0.01, 0.02, 0.1, 0.01, 0.8, 0.01, 0.07] for the city attribute. The first component 0.05 in the vector denotes the probability of the city attribute starting at the token "walmart." Because the $6^{th}$ coordinate is the maximum among all coordinates, the city attribute is most likely to start at the token "madison." Suppose the vector for the street attribute is [0.1, 0.7, 0.8, 0.7, 0.9, 0.5, 0.4, 0.1]. If the maximum among all coordinates of the first vector occurs before the corresponding maximum for the second vector, then the first attribute "precedes" the second attribute. If there is a tie, the system chooses one of the two attributes with equal probability. In the above example, the maximum for the city vector occurs at the sixth coordinate and that for the street occurs at the fifth coordinate. Therefore, street attribute value precedes the city attribute value for this input string. The fraction of input strings in the entire batch where attribute Ai precedes Aj is an estimate for Ai preceding Aj.

These estimate probabilities are obtained from the ARMs that are already known from the relation R. Formally, let s be a given input string within a batch S of strings. Tokenize s into a sequence $t_1, \ldots, t_m$ of tokens and associate with each attribute $A_i$ ($1 \leq i \leq n$) a vector $v(s,A_i)=[v_{i1}, \ldots, v_{im}]$. The component $v_{ij}$ is an estimate of the attribute value for $A_i$ starting at the token $t_j$; $v_{ij}$ is the maximum probability with which $ARM_i$ accepts any prefix (sequence of tokens beginning at $t_{ij}$ and ending with $t_{ip}$, where p<=m) of $[t_{ij}, \ldots, t_{im}]$. Let $max(v(s,A_i))$ denote the coordinate corresponding to the maximum among values $v_{i1}, \ldots, v_{im}$. That is, $max(v(s,A_i))= argmax_j\{v_{ij}\}$.

The precedence estimate $prec(A_i,A_j)$ is:

$$prec(A_i, A_j) = \frac{|\{s \in S : max(v(s, A_i)) < max(v(s, A_j))\}|}{|S|}$$

At the end of this phase, the system possesses the pairwise precedence estimates between all pairs of attributes. Computationally, this procedure requires invoking the ARMs for determining acceptance probabilities of sub-sequences of contiguous tokens from each input string in a batch. If the average number of tokens in an input string is m, this computation involves $O(m^2)$ calls to ARMs. These acceptance probabilities can be cached and later used during the actual segmentation, thus avoiding repeated invocation of ARMs.

Determining Probabilistic Attribute Order

Using the precedence estimates, the exemplary system determines the probability that an attribute $A_i$ immediately precedes attribute $A_j$. The precedence probability $prec\cdot(A_i, A_j)$ that $A_i$ immediately precedes $A_j$ is the probability that $A_i$ precedes $A_j$ and $A_j$ precedes every other attribute that $A_i$ precedes. Formally, $$prec*(A_j, A_k) = \sum_{\substack{S \subset A - \{A_{ij}\} \\ A_j \in S}} \prod_{\substack{A_k \in S \\ A_k \neq A_j}} prec(A_i, A_k) * prec(A_j, A_k)$$

Observe that the directed graph induced by the set of attributes and the precedence probabilities defines a hidden markov model. Each state corresponds to an attribute and the transition probability between two states is the precedence probability between the corresponding attributes. In addition, one must add a start and an end state. The transition probability from the start state to any state is the probability that the attribute corresponding to s is the first attribute. Transition probabilities to the end state can be computed similarly. This is one possible process for determining attribute order. A partial (or total) order determination among the attributes using a variety of other search algorithms can be used.

Real Time Segmentation

The step of determining order of attributes is an optimization. This is because evaluation of any combination of attribute order using all possible combinations is a large task that requires greater processing time. Consider table 2 below:

TABLE 2

| Attribute | State | Token 1 | Token 2 | ... | ... | Token n |
|---|---|---|---|---|---|---|
| Name | $S_1$(begin) | Prob | | | | |
| Name | $S_2$(begin) | | prob | | prob | |
| Name | ... | | | | | |
| Name | $S_N$(end) | | | prob | | |
| Address | $S_1$(begin) | | | | | |
| Address | $S_2$(begin) | | | | | |
| Address | ... | | prob | | | |
| Address | $S_M$(end) | | | | | |

Table 2 is organized into rows and columns wherein the column headings across the table correspond to the tokens of an input string to be evaluated in the order in which it is encountered within the string. Each value in the table is a probability. For each column a maximum probability determines into which attribute that string token will be assigned during the segmentation. Based on this design table 2 has many rows, one row for each possible state for the first token in each of the multiple ARMs. During real time analysis, the processor of the computer doing the segmentation starts with the first token (token 1) and based on the ARM of each attribute will assign a probability to that token for each possible state of the ARM. It considers all possible segmentations of the input string into attribute values and then returns the one that gets the best segmentation probability as computed using the ARMs on each attribute. This exemplary procedure is configurable with the knowledge about the attribute order in input strings. The first option is deployed when the attribute order in the input string is known. The second option determines the attribute order from a batch of input strings assuming that the same order is prevalent across all input strings, and the determined order is used across all input strings. The third option determines the best attribute order for each input string.

Under the first option, the attribute order in the input string is given. The exemplary procedure uses a dynamic programming strategy to determine the best segmentation, one that corresponds to the highest probability, of the input string into fields. The table 2 is filled in one column at a time beginning with the column marked by token 1 and then moving to the column associated with token 2, 3, etc until the table is full. A given column must be filled in completely before a subsequently column can be filled in. The contents of column i+1 are computed based on those of column i, the token corresponding to column i+1, and the states that head the rows of the table. Each cell in the table contains a probability and a back-pointer to a cell in the previous column. We say that the state of cell c is the state that heads the column in which c occurs. The probability contained in a cell c is the product of the probability contained in the cell c' referred to by the back-pointer of c and the transition probability from the state of c to the state of c'. The back-pointer of c is selected so as to maximize the probability in c. Applying this approach recursively fills in the table given initial values in the first column. The values used for the first column are the emission probabilities of the first token in each state.

Under the second option, the exemplary procedure determines the best attribute order using a batch of input strings. The procedure described in the Section "Determining Attribute Value Order" above is used here.

Under the third option, the exemplary procedure iterates through all possible attribute orders and returns the most probable segmentation of the input string into attribute values. Because this procedure iterates through all possible attribute orders, this is more expensive than options one and two.

Exploiting Large Reference Tables

Experience with the exemplary embodiment indicates that an increase in segmentation accuracy occurs as the size of the reference table increases. Therefore, (i) exploiting rich dictionaries from large reference tables is important to achieve higher segmentation accuracy, and (ii) the exemplary segmentation system must scale to large reference table sizes. The exemplary system takes just a few minutes(less than five) to learn ARMs over a reference table of 200,000 tuples. In contrast, supervised systems relying on cross-validation approaches would be at least an order of magnitude slower.

The exemplary system associates a state with each base token that is retained in the ARM. An alternative embodiment collapses many base tokens together into one state of the HMM. Such collapsing results in the loss of transitional information by collapsing transitions together. Collapsing base tokens together into one state, results in substantially lower (sometimes by 10%) segmentation accuracy. The price of this accuracy gain is a larger model size. However, a compromise achieves high accuracy by retaining only important base tokens.

Scalability

Experience with the exemplary embodiment has been gained with different reference table sizes. It has been the case that the model sizes are usually small relative to current desktop computer main memory sizes and that they can be further reduced by retaining important base tokens (rather than all tokens) without compromising accuracy. Retaining only a fraction of the base tokens in ARMs produces a similar segmentation accuracy as that obtained when retaining all base tokens. Thus, an alternate embodiment can significantly reduce memory requirements without compromising on segmentation accuracy.

While an exemplary embodiment of the present invention has been described with a degree of particularity, it is the intent that the invention include modifications from the disclosed design falling within the spirit or scope of the appended claims.

The invention claimed is:

1. A process to evaluate an input string to segment said string into component parts comprising:
providing a state transition model derived from training data from an existing collection of data records that includes probabilities to segment input strings into component parts, wherein the training data corresponding to database attributes in the existing collection of data records does not comprise manually segmented training data, and the state transition model categorizes tokens in database attribute values of the data records into positions based on a fixed beginning, middle, and trailing token topology that:
categorizes each boundary token of a database attribute value that includes multiple tokens into corresponding beginning and trailing positions,
categorizes each token that does not comprise a boundary token of a database attribute value into a middle position,
defines beginning, middle, and trailing state categories, wherein each state category includes states that accept tokens only if appearing in a corresponding one of said beginning, middle, and trailing positions, and
adjusts said states and probabilities associated with said states within said state categories in order to relax sequential specificity and account for erroneous token placement when evaluating tokens in the input string appearing in particular positions, wherein the state category corresponding to a particular position in which the token appears is adjusted to include states from another state category that accept tokens appearing in a different position;
determining a most probable segmentation of the input string by comparing tokens that make up the input string with the state transition model derived from the existing collection of data records;
segmenting the input string into one or more component parts according to the most probable segmentation; and
storing the one or more component parts in a database on a computer system.

2. The process of claim 1 wherein the state transition model has probabilities for multiple states of said model and a most probable segmentation is determined based on a most probable token emission path through different states of the state transition model from a beginning state to an end state.

3. The process of claim 1 wherein the collection of data records is stored in a database relation and an order of attributes for the database relation as the most probable segmentation is determined.

4. The process of claim 3 wherein the input string is segmented into sub-components which correspond to attributes of the database relation.

5. The process of claim 4 wherein the tokens that make up the input string are substrings of said input string.

6. The process of claim 5 wherein the input string is to be segmented into database attributes and wherein each attribute has a state transition model based on the contents of the database relation.

7. The process of claim 6 wherein the state transition model has multiple states for a beginning, middle, and trailing position within an input string.

8. The process of claim 6 wherein the state transition model has probabilities for the states and a most probable segmentation is determined based on a most probable token emission path through different states of the state transition model from a beginning state to an end state.

9. The process of claim 5 wherein input attribute order for records to be segmented is known in advance of segmentation of an input string.

10. The process of claim 5 wherein an attribute order is learned from a batch of records that are inserted into the state transition model.

11. The process of claim 6 wherein the state transition model has at least some states corresponding to base tokens occurring in the reference relation.

12. The process of claim 6 wherein the state transition model has class states corresponding to token patterns within said reference relation.

13. The process of claim 8 wherein the state transition model includes states that account for missing, misordered and inserted tokens within an attribute.

14. The process of claim 13 wherein:
the state transition model accounts for misordered and inserted tokens when evaluating a boundary token in the input string by copying states from a middle state category into one of a beginning state category or a trailing state category, and
the state transition model accounts for misordered and inserted tokens when evaluating a middle token in the input string by copying states from the beginning state category or the trailing state category into the middle state category.

15. A computer readable storage medium containing instructions causing a computer to perform the process of claim 1.

16. A process for segmenting strings into component parts comprising:
providing a reference table of string records that are segmented into multiple substrings corresponding to database attributes, wherein the reference table of string records does not comprise manually segmented training data;
analyzing the substrings within database attribute values of string records for an attribute during a training phase to provide a state model that categorizes the substrings within database attribute values into positions based on a fixed beginning, middle, and trailing token topology for said attribute that:
categorizes beginning and trailing substrings of a database attribute value that includes multiple substrings into corresponding beginning and trailing positions,
categorizes each substring of the database attribute value that does not comprise a beginning or trailing substring into a middle position,
accepts a null token for an empty attribute component,
defines beginning, middle, and trailing state categories, wherein each state category includes states that accept tokens only if appearing in a corresponding one of said beginning, middle, and trailing positions, and
adjusts said states and probabilities associated with said states within said state categories in order to relax sequential specificity and account for erroneous token placement when evaluating tokens in the input string appearing in particular positions, wherein the state category corresponding to a particular position in which the token appears is adjusted to include states from another state category that accept tokens appearing in a different position;
breaking an input record into a sequence of tokens;
determining a most probable segmentation of the input record by comparing the tokens of the input record with state models derived for attributes from the reference table;
segmenting the input record into one or more component parts according to the most probable segmentation; and
storing the one or more component parts in a database on a computer system.

17. A computer system for processing input strings to segment those records for inclusion into a database comprising:
a) a database management system to store records organized into relations wherein data records within a relation are organized into a number of attributes;
b) a model building component on the computer system that builds a number of attribute recognition models derived from training data from an existing relation of data records, wherein training data corresponding to database attributes in the existing relation of data records does not comprise manually segmented training data, wherein one or more of said attribute recognition models includes probabilities for segmenting input strings into component parts which categorizes tokens in database attribute values of the data records into positions based on a fixed beginning, middle, and trailing token topology that:
categorizes each boundary token of a database attribute value that includes multiple tokens into corresponding beginning and trailing positions,
categorizes each token that does not comprise a boundary token of a database attribute value into a middle position,
defines beginning, middle, and trailing state categories, wherein each state category includes states that accept tokens only if appearing in a corresponding one of said beginning, middle, and trailing positions, and
adjusts said states and probabilities associated with said states within said state categories in order to relax sequential specificity and account for erroneous entries when evaluating tokens within an input string appearing in particular positions, wherein the state category corresponding to a particular position in which the token appears is adjusted to include states from another state category that accept tokens appearing in a different position; and
c) a segmenting component on the computer system that receives an input string and determines a most probable record segmentation by evaluating transition probabilities of states within the attribute recognition models built by the model building component.

18. The system of claim 17 wherein the segmenting component receives a batch of evaluation strings and determines an attribute order of strings in said batch and thereafter assumes the input string has tokens in the same attribute order as the evaluation strings.

19. The system of claim 18 wherein the segmenting component evaluates the tokens in an order in which they are contained in the input string and considers state transitions from multiple attribute recognition models to find a maximum probability for the state of a token to provide a maximum probability for each token in said input string.

20. The system of claim 17 wherein:
the model building component accounts for erroneous entries when evaluating a boundary token in the input string by copying states from a middle state category into one of a beginning state category and a trailing state category, and
the model building component accounts for erroneous entries when evaluating a middle token in the input string by copying states from the beginning state category or the trailing state category into the middle state category.

21. The system of claim 20 wherein the model building component defines a start and end state for each model and accommodates missing attributes by assigning a probability for a transition from the start to the end state.

22. The process of claim 1 wherein determining a most probable segmentation of the input string comprises:
considering a first token in the input string and determining a maximum state probability for said first token based on state transition models for multiple data table attributes, and
considering in turn subsequent tokens in the input string and determining maximum state probabilities for said subsequent tokens from a previous token state until all tokens are considered, and
wherein segmenting the input string comprises segmenting the input string by assigning the tokens of the input string to attribute states of the state transition models corresponding to said maximum state probabilities, wherein the state transition models are derived from training data from the existing collection of data records that does not comprise manually segmented training data.

23. The process of claim 22 further comprising determining an attribute order for a batch of input string records and using the order to limit the possible state probabilities when evaluating tokens in the input string.

24. A system for evaluating an input string to segment said input string into component parts comprising:
means for providing a state transition model derived from training data from an existing collection of data records that includes probabilities to segment input strings into component parts, wherein the training data corresponding to database attributes in the existing collection of data records does not comprise manually segmented training data, and the state transition model categorizes tokens in database attribute values of the data records into positions based on a fixed beginning, middle, and trailing token topology that:
categorizes each boundary token of a database attribute value that includes multiple tokens into corresponding beginning and trailing positions,
categorizes each token that does not comprise a boundary token of a database attribute value into a middle position,
defines beginning, middle, and trailing state categories, wherein each state category includes states for that accept tokens only if appearing in a corresponding one of said beginning, middle, and trailing positions, and
adjusts said states and probabilities associated with said states within said state categories in order to relax sequential specificity and account for erroneous token placement when evaluating tokens in the input string appearing in particular positions, wherein the state category corresponding to a particular position in which the token appears is adjusted to include states from another state category that accept tokens appearing in a different position;
means for determining a most probable segmentation of the input string by comparing an order of tokens that make up the input string with the state transition model derived from the existing collection of data records;
means for segmenting the input string into one or more component parts according to the most probable segmentation; and
means for storing the one or more component parts in a database on a computer system.

25. The system of claim 24 wherein the state transition model has probabilities for multiple states of said model and a most probable segmentation is determined based on a most probable token emission path through different states of the state transition model from a beginning state to an end state.

26. The system of claim 24 additionally including means for maintaining a collection of records, wherein the collection of records is stored in a database relation.

27. The system of claim 26 wherein the input string is segmented into sub-components which correspond to attributes of the database relation.

28. The system of claim 27 wherein the tokens that make up the input string are substrings of said input string.

29. The system of claim 27 wherein the input string is to be segmented into database attributes and wherein each attribute has a state transition model based on the contents of the database relation.

30. The system of claim 29 wherein each state category of the state transition model has multiple states for accepting a boundary token or a middle token within an input string.

31. The system of claim 29 wherein the state transition model has probabilities for the states and a most probable segmentation is determined based on a most probable state path through different states of the state transition model from a beginning state to an end state.

* * * * *

UNITED STATES PATENT AND TRADEMARK OFFICE
CERTIFICATE OF CORRECTION

PATENT NO. : 7,627,567 B2  
APPLICATION NO. : 10/825488  
DATED : December 1, 2009  
INVENTOR(S) : Venkatesh Ganti et al.

Page 1 of 1

It is certified that error appears in the above-identified patent and that said Letters Patent is hereby corrected as shown below:

In column 22, line 5, in Claim 24, after "states" delete "for".

Signed and Sealed this  
Eighth Day of February, 2011

David J. Kappos  
*Director of the United States Patent and Trademark Office*